April 8, 1941.  H. W. RUSSELL  2,237,713
OPTICAL PYROMETER
Filed Sept. 20, 1938   2 Sheets-Sheet 1

INVENTOR.
Howard W. Russell.
BY
Corbery & Mahoney
ATTORNEYS

April 8, 1941.　　　H. W. RUSSELL　　　2,237,713
OPTICAL PYROMETER
Filed Sept. 20, 1938　　　2 Sheets-Sheet 2

INVENTOR.
Howard W. Russell.
BY
ATTORNEYS.

Patented Apr. 8, 1941

2,237,713

UNITED STATES PATENT OFFICE 2,237,713

OPTICAL PYROMETER

Howard W. Russell, Columbus, Ohio, assignor to Battelle Memorial Institute, Columbus, Ohio, a corporation of Ohio Application September 20, 1938, Serial No. 230,828

2 Claims. (Cl. 88—22.5)

My invention relates to an optical pyrometer. It has to do, more particularly, with apparatus for determining and indicating the temperature of bodies which give off radiant energy. More specifically, my invention deals with apparatus for determining and indicating or recording the true temperature of a radiant body, the invention being based on the principle of measuring simultaneously, by means of photoelectric cells or similar means, the intensities of two monochromatic radiations and of indicating their ratio. This ratio is a true indication of the temperature.

There are photoelectric type optical pyrometers on the market at the present time which are either indicating or recording. One such type of pyrometer employs two photoelectric cells, each of which is in a separate arm of a Wheatstone's bridge circuit. One of these cells receives radiation from the source whose temperature is to be measured, while the other is activated by a standard electric lamp, the intensity of which may be varied by a suitable resistance. Changes in temperature of the source cause changes in intensity of the radiation falling on the photoelectric cell, with accompanying changes in resistance of the arm of the Wheatstone's bridge. Manipulation of the variable resistance either manually or by automatic means varies the current through the standard lamp until balance in the bridge is restored. This change in current is a measure of the change in temperature of the source.

Such an instrument should theoretically measure the correct temperature of a black body, but due to the fact that all bodies possess different emissive powers, the above instrument would give wrong temperature indications for bodies of differing emissive powers but of the same temperature.

Several so-called two-color pyrometers have been manufactured, which to a greater or lesser extent overcome this difficulty. The two-color wedge, for example, employing the principle of two colors, red and green, mixed in a certain ratio as an indicator of true temperature, has been used. This device consists of a wedge-shaped filter which transmits a fixed amount of red but a varying amount of green from one end to the other of the filter. Looking through the filter at an incandescent source, the observer will perceive one point where the two colors appear as a whitish-yellow mixture. An increase in temperature in the source increases the green content of the radiation and thus moves the above-indicated point along the wedge. This change in position is a measure of the temperature change of the source. The great disadvantage of such an instrument is in the unreliability of the eye to duplicate color matches.

Using the two-color principle, a German pyrometer has been invented which employs a separate light source distinct from the radiant body whose temperature is to be measured. This prior art instrument requires visual comparison and manual adjustment to secure a match of both color and brightness.

One of the objects of my invention is to provide apparatus for determining and indicating the true temperature of a radiant body, the invention being based on the principle of measuring simultaneously the intensities of two monochromatic radiations and indicating their ratio, thereby indicating the true temperature of the radiant body.

Another object of my invention is to provide apparatus for determining and indicating the true temperature of a radiant body which is of such a nature that the temperature measurements will be relatively free from errors due to emissivity and absorption due to smoke.

Another object of my invention is to provide a pyrometer which is of such a nature that it will indicate the true temperature of the radiant body regardless of changes in intensity of the radiations being given off by the body.

Another object of my invention is to provide an optical pyrometer of the type indicated which is relatively simple but which is very efficient.

From Wien's radiation law the monochromatic energy of radiation from any body of absolute temperature $T$ is $$J_\lambda = C_1 E \lambda^{-5} e^{-\frac{C_2}{\lambda T}}$$

where $C_1$ and $C_2$ are constants, $\lambda$ is the wavelength of the monochromatic radiation, and $E$ is the emissivity of the emitter, and is defined as the ratio of the monochromatic energy emitted by the body to that emitted by a perfectly black body at the same temperature. A black body is one which at all temperatures will absorb all the radiation falling on it.

Consider two monochromatic radiations of wavelength $\lambda_1$ and $\lambda_2$, respectively. Then we have $$J_{\lambda_1} = C_1 E_1 \lambda_1^{-5} e^{-\frac{C_2}{\lambda_1 T}}$$

and $$J_{\lambda_2}=C_1E_2\lambda_2^{-5}e^{-\frac{C_2}{\lambda_2 T}}$$

and $$\frac{J_{\lambda_1}}{J_{\lambda_2}}=\frac{E_1}{E_2}\left(\frac{\lambda_1}{\lambda_2}\right)^{-5}e^{\frac{C_2}{T}\left(\frac{1}{\lambda_2}-\frac{1}{\lambda_1}\right)}$$

Applying logarithms:

$$\log\frac{J_{\lambda_1}}{J_{\lambda_2}}=\log\frac{E_1}{E_2}-5\log\left(\frac{\lambda_1}{\lambda_2}\right)+\frac{C_2}{T}\left(\frac{1}{\lambda_2}-\frac{1}{\lambda_1}\right)$$

Since $\lambda_1$ and $\lambda_2$ are constant and since $$\frac{E_1}{E_2}$$

is so for metals such as iron and steel, then:

$$\log\frac{J_{\lambda_1}}{J_{\lambda_2}}=A+\frac{B}{T}$$

where $$A=\log\frac{E_1}{E_2}-5\log\left(\frac{\lambda_1}{\lambda_2}\right)$$

and $$B=C_2\left(\frac{1}{\lambda_2}-\frac{1}{\lambda_1}\right)$$

The resulting graph of $$\log\frac{J_{\lambda_1}}{J_{\lambda_2}}\text{ against }\frac{1}{T}$$

is a straight line. Hence, if $$\frac{J_{\lambda_1}}{J_{\lambda_2}}$$

is known at any temperature $T$, then the temperature may be found for any other value of $$\frac{J_{\lambda_1}}{J_{\lambda_2}}$$

In the art of pyrometry monochromatic radiation refers to radiation covering a band of wavelengths but having a mean effective wavelength which changes only slightly with changes in the temperature of the source of the radiation. The wavelength used in the theory is this mean effective wavelength.

My invention proposes to measure simultaneously by means of photoelectric cells or other photosensitive or light-sensitive means, the intensities of two monochromatic radiations and to indicate their ratio. Knowing the ratio of two monochromatic radiations from a body whose temperature is to be measured, the temperature of the body can be determined by means of the above-indicated formula. If the ratio of the two monochromatic radiations is known when the body is at any temperature, that particular temperature can be found.

In the accompanying drawings I have illustrated my invention incorporated in two different forms of optical pyrometers. However, it is to be understood that my invention may be embodied in other forms of apparatus. In the drawings like characters of reference designate corresponding parts and:

With reference to the drawings and particularly to Figures 1 to 4, inclusive, I have illustrated an optical pyrometer embodying the principles of my invention. This pyrometer is of a type which will both indicate and record the true temperature of a radiant body. With my instrument, the light rays emanating from a body whose temperature is to be determined are divided into two separate monochromatic radiations. These monochromatic radiations are employed to actuate photoelectric cells or other photosensitive or light-sensitive means. Each of these photoelectric cells is connected to one side of an electric circuit. Each side of this circuit is provided with means for amplifying the current produced by the activated photoelectric cell to which it is connected. Means is associated with the circuit for indicating and recording the ratio of the intensity of the current in one side of the circuit, produced by one of the monochromatic radiations, to the intensity of the current in the other side of the circuit, produced by the other monochromatic radiation, and thereby indicate and record the ratio of the intensity of one of the monochromatic radiations to the intensity of the other monochromatic radiation. This ratio of the intensities of the two monochromatic radiations will indicate the true temperature of the radiant body. The recording device connected to the circuit may be calibrated, according to the formula previously referred to, so that the actual temperature will be recorded thereby.

Figure 1:
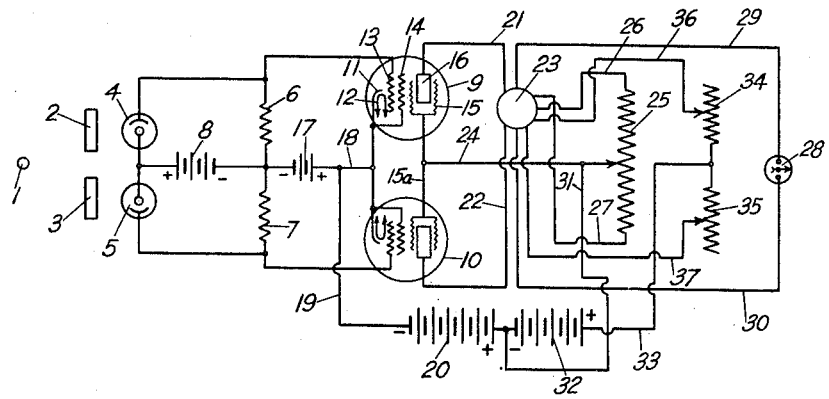
Figure 1 is a diagrammatic view showing the circuit of an optical pyrometer embodying the principles of my invention, this pyrometer being of the recording type.

In Figure 1 I have illustrated diagrammatically an instrument by means of which this may be accomplished. The numeral 1 indicates the body whose temperature is to be determined. Light from the source 1 passes through two filters designated 2 and 3, respectively. The filter 2 is preferably of such a type that it will transmit only the red light rays coming from the body 1 while the filter 3 is preferably of such a type that it will transmit only the green light rays. The red light rays will strike a photoelectric cell 4 and the green light rays will strike a photoelectric cell 5. Instead of employing photoelectric cells, other photosensitive or light-sensitive means may be employed for varying the currents in the two sides of the circuit in response to variations in the intensities of the two monochromatic radiations.

The photoelectric cell 4 is connected into a circuit which is provided with a grid resistance 6 while the photoelectric cell 5 is connected into a circuit which is provided with a grid resistance 7. A battery 8 is connected to both photoelectric cells in the manner indicated. This battery may be a 45 volt battery. The currents produced by the monochromatic radiations activating the photoelectric cells 4 and 5 will flow through the respective circuits which include the grid resistances 6 and 7. These currents will be amplified by amplifying circuits including vacuum tube amplifiers 9 and 10.

These amplifying tubes are preferably of the type indicated, although other suitable types may be employed. As shown, each amplifying tube comprises a cathode 11, a cathode heater 12, a grid 13, a suppressor 14, a screen grid 15 and a plate 16. A battery 17 which may be of the three-volt type is connected by a line 18 to the cathodes 11 and the suppressors 14 of the tubes 9 and 10. A line 19 leads from the negative terminal of a battery 20 and is connected to the line 18. The plates 16 of the vacuum tubes are connected together by lines 21 and 22 while the screen grids 15 are connected together by a line 15a. The current created by the monochromatic radiations actuating the photoelectric cells 4 and 5 will be amplified by the circuits including the vacuum tubes 9 and 10 respectively.

As previously indicated by comparing the intensities of the currents produced by the respective monochromatic radiations, the temperature of the object 1 may be determined. Therefore, I provide means associated with this circuit for indicating and recording the ratio of the intensity of the current produced by one of the monochromatic radiations to the intensity of the current produced by the other monochromatic radiation. This will in turn indicate the true ratio of the intensity of one of the monochramatic radiations to that of the other monochromatic radiation. From this the true temperature of the body will be indicated and the recording means which I preferably associate with the circuit may be so calibrated that actual temperature readings may be taken therefrom.

For comparing the intensities of the two currents and for indicating their true ratio, I provide the following means. The lines 21 and 22 which connect the plates 16 of the vacuum tubes are connected to two terminals of a switch 23. For the sake of clearness, this switch is not shown in detail in Figure 1 but is illustrated in detail in Figure 4. Furthermore, to avoid confusion the details of this switch will be described hereinafter. This switch 23 is of a four-pole three-throw type.

The line 15a that connects the screen grids of the vacuum tubes is connected by a line 24 to the slider of a slide wire resistance 25. This slide wire resistance 25 may form a part of a recorder which is preferably associated with the circuit and which is of the self balancing type in which a slide contact is moved relative to a slide wire resistance in response to the deflection of a galvanometer. It is preferably so arranged and calibrated that it will give true temperature readings. One end of the resistance 25 has a line 26 leading therefrom which is connected to a terminal of the switch 23. The opposite end of the resistance 25 has a line 27 connected thereto which is connected to another terminal of the switch 23. A galvanometer 28 is associated with the recorder and is connected by lines 29 and 30 to different terminals of the switch 23.

A line 31 connects the line 24 and the slider of resistance 25 to the positive terminal of the battery 20 and to the negative terminal of a battery 32. The negative terminal of the battery 32 is connected to the positive terminal of the battery 20, as indicated. The batteries 20 and 32 may be 90-volt batteries. The positive terminal of battery 32 is connected by a line 33 to two variable resistances 34 and 35, one of which is provided in each side of the circuit. The variable resistance 34 is connected by a line 36 to one terminal of the switch 23. The variable resistance 35 is connected by means of a line 37 to another terminal of the switch 23.

With this arrangement, the current produced by the monochromatic radiation passing through filter 2 and actuating photoelectric cell 4 will be amplified by the amplifying circuit including the amplifying tube 9. This current, when switch 23 is set properly as will be explained hereinafter, will pass through one side of the slide wire resistance 25 of the recorder. The current produced by the monochromatic radiation passing through filter 3 and actuating photoelectric cell 5 will be amplified by the amplifying circuit including the amplifying tube 10. This current with the switch 23 set properly, as indicated above, will pass through the opposite side of the slide wire resistance 25.

The variable resistances 34 and 35 are adapted to be employed, as will be explained in detail hereinafter, for varying the current passing through them until the current in each side of resistance 25 is zero when no light falls on photoelectric cells 4 and 5. In other words, the resistances 34 and 35 are adapted to be employed to balance out the original currents produced in opposite sides of the resistance 25 by the amplifying tubes 9 and 10. Therefore, when the photoelectric cells 4 and 5 are activated by light striking them and the amplified currents produced thereby pass into opposite sides of the resistance 25, the ratio of these currents will not be affected by the original currents in the amplifying circuits. Consequently, these currents in opposite sides of the resistance 25 are proportional to the monochromatic radiations falling on the photoelectric cells 4 and 5 respectively.

If at any temperature of the body 1, the slider of the resistance 25 is adjusted until no current flows in the galvanometer 28, then the potential drops across the sides of the resistance 25 are equal to each other, and the ratio of the resistances of the sides of member 25 is inversely proportional to the ratio of the energies produced by the monochromatic radiations falling on photoelectric cells 4 and 5. Thus, at any temperature the ratio of the resistances is inversely proportional to the ratio of the radiations falling on the two photoelectric cells when the galvanometer reads zero.

Thus, to determine the temperature it is merely necessary to place the instrument so that the radiations from the body 1 will pass through the filters 2 and 3. This will cause the galvanometer to move away from the zero position because of the currents produced in opposite sides of the circuit by means of the respective monochromatic radiations. It is then merely necessary to adjust the slider of the resistance 25 until the galvanometer returns to zero. The position of this slider relative to the member 25 will indicate the proportion of the intensity of one of the currents produced by one of the monochromatic radiations to the intensity of the other current produced by the other monochromatic radiation. The instrument is so designed that the position of the slider indicates the true ratio of the currents and a recording means may be associated with this slider resistance so that the actual temperature will be recorded and indicated. The slide wire resistance is preferably the slide wire resistance of a standard recording potentiometer and the galvanometer used is that of the recorder.

Figure 4:
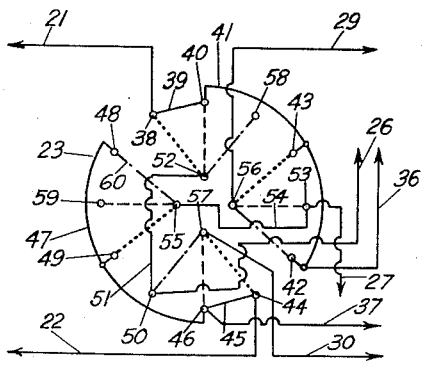
Figure 4 is a diagrammatic view illustrating a four-pole three-throw switch used for placing the galvanometer in three positions in the circuit.

The switch 23 is illustrated diagrammatically in Figure 4. This switch is provided for switching the galvanometer 28 across the resistance 25, or into either side of the resistance 25, in order to adjust the currents in each side by means of the respective variable resistances 34 and 35 so that the galvanometer will indicate zero when there is no light passing through the filters. In this way, the effect on the recorder of the original currents due to the amplifiers is eliminated and therefore the recorder will indicate the true ratio of the intensities of the currents actually produced by the monochromatic radiations. When the effect of the vacuum tube currents is eliminated, the galvanometer 28 may again be connected across the resistance 25 and if no light is passing through the filters 2 and 3, the galvanometer will point to zero. When light passes through the filters 2 and 3, the galvanometer will move away from zero and to obtain the ratio of the currents produced, the slider resistance is merely adjusted until the galvanometer again indicates zero.

As shown in Figure 4, the line 21 is connected to a terminal or contact 38 of the switch. This contact is connected by a wire 39 to a terminal 40. The contact 40 is connected by a wire 41 to a contact 42. A contact 43 is also connected to the wire 41. The wire 22 is connected to a contact 44 of the switch which is connected by a wire 45 to a contact 46. The line 37 is also connected to this contact 46. The contact 46 is connected by a wire 47 to a contact 48. A contact 49 is also connected to the wire 47. The wire 26 is connected to one of the contacts 50 of the switch which is connected by a wire 51 to one of the poles 52 of the switch. The wire 27 is connected to a contact 53 of the switch which is connected by a wire 54 to one of the poles 55 of the switch. The wire 29 is connected to one of the poles 56 of the switch. The line 30 is connected to the remaining pole 57 of the switch. The wire 36 is also connected to the contact 42. A dummy contact 58 is provided intermediate contacts 40 and 43 and a similar contact 59 is provided intermediate contacts 48 and 49.

As previously stated, the switch is a four-pole three-throw switch. It will be understood that this switch will be provided with four conducting members indicated by the numeral 60 adapted to selectively connect the poles 52, 55, 56 and 57 of the switch with the contacts 38, 40, 58, 43, 53, 42, 44, 46, 50, 49, 59 and 48 of the switch as indicated by the broken lines in Figure 4. The switch may be rotated to move the contact members into the three different positions indicated by the three different types of broken lines of Figure 4. The dotted lines indicate the positions of the four conducting members 60 of the switch when the galvanometer 28 is connected across the resistance 25. The broken lines consisting of the dashes illustrate the positions the various members 60 will occupy when the switch is adjusted to connect the galvanometer 28 to indicate only the current in one side of the resistance 25. The broken lines consisting of dots and dashes illustrate the positions the various members 60 will occupy when the switch is adjusted to connect the galvanometer 28 to indicate only the current in the opposite side of the resistance 25.

In actual practice I prefer that all the batteries with the exception of the grid battery 17 be replaced by a regulated voltage supply which can be connected to alternating current mains carrying 115 volts.

Figure 2:
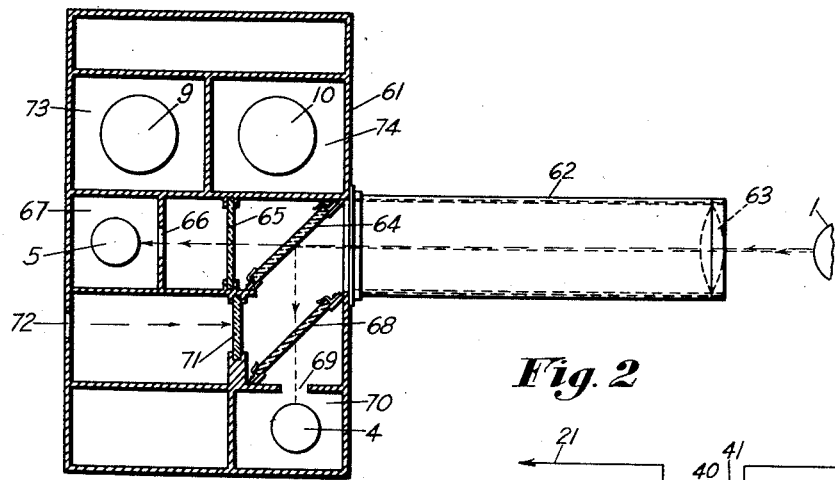
Figure 2 is a horizontal section taken through the housing in which the photoelectric cells and optical system of my device are enclosed.
Figure 3:
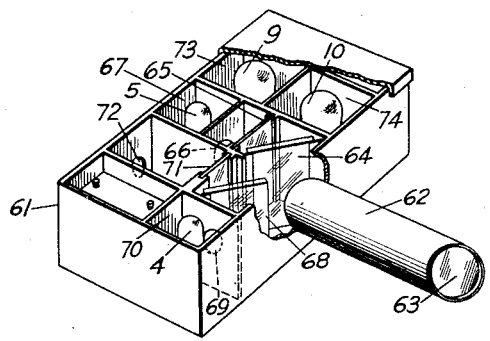
Figure 3 is a perspective view partly broken away of the structure illustrated in Figure 2.

In Figures 2 and 3 I have illustrated the optical system of my instrument. In Figure 2 I have shown a main housing 61 which is adapted to contain certain parts of my apparatus. This housing has a tube 62 extending forwardly therefrom. A lens system 63 is provided at the forward end of the tube 62. Directly behind the open rear end of the tube 62 and supported within the housing 61 is a filter member 64 which is supported at an angle of approximately 45 degrees relative to the axis of the tube 62. This member 64 embodies a sheet of glass on which a thin film of gold is evaporated. The advantage of such a filter is that almost all the red light is reflected while almost all the green light is transmitted. The green light passing through the filter 64 passes through the second green filter 65 supported in the housing 61 and then passes through an opening 66 into chamber 67 within which the photoelectric cell 5 is disposed.

The red light reflected by the member 64 passes downwardly through a red filter 68 which is supported within the housing 61 substantially parallel to member 64. This red light passes through an opening 69 into a chamber 70 formed within housing 61 in which the photoelectric cell 4 is disposed. Since the member 68 is at an angle of approximately 45 degrees, part of the light falling on this filter 68 will be reflected rearwardly onto a ground glass screen 71 supported vertically and disposed directly behind filter 68. Thus, the light is simultaneously focused on the photoelectric tubes 4 and 5 and the ground glass screen 71. The image on the screen 71 can be observed through a peephole 72 provided in the rear wall of the housing 61 in alignment with screen 71.

If desired, the vacuum tubes 9 and 10 may also be disposed in chambers 73 and 74 within housing 61. The remainder of the apparatus may be disposed in other suitable housings. Cables will lead from the portion of the instrument shown in Figure 2 to the voltage supply and to the recording means.

In using my device, the housing 61 and the object 1 whose temperature is to be measured will be disposed relative to each other in such a manner that the light given off by the object will pass through the lens system 63 into the instrument. This light will be separated into monochromatic radiations, for example, red and green. The red and green radiations will actuate the photoelectric tubes 4 and 5 respectively. As previously indicated, this will produce currents in opposite sides of the circuit which will be amplified by the vacuum tube amplifiers. The recording means associated with the circuit will record the true ratio of the intensity of the current produced by the red radiations to the intensity of the current produced by the green radiations. This will indicate the true temperature of the object.

Figure 5:
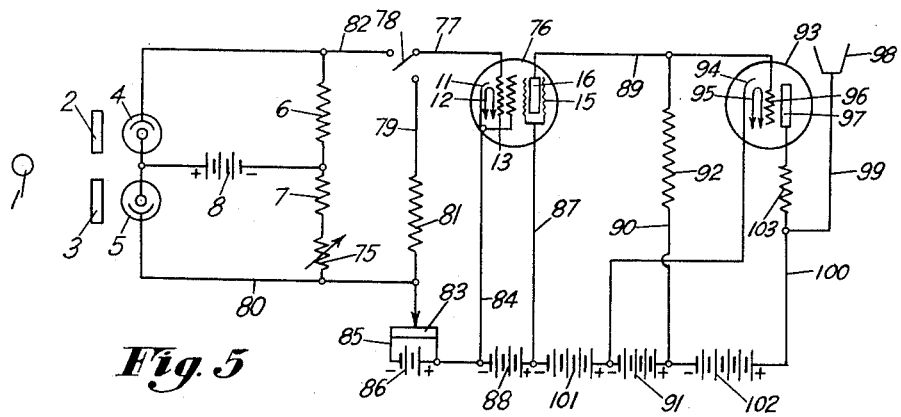
Figure 5 is a diagrammatic view illustrating the electrical circuit of a different form of pyrometer which is of the indicating type.
Figure 6:
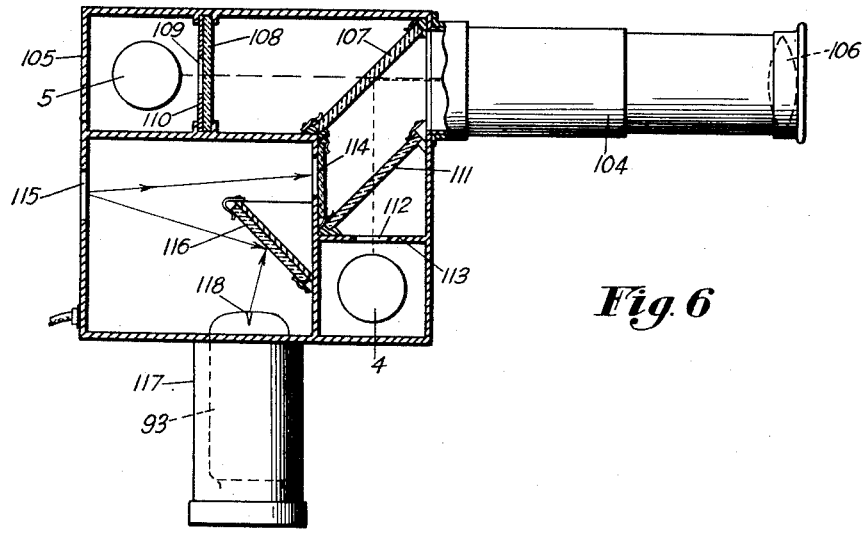
Figure 6 is a vertical section taken through a housing enclosing the photoelectric cells and optical system of a pyrometer of the type illustrated in Figure 5.
Figure 7:
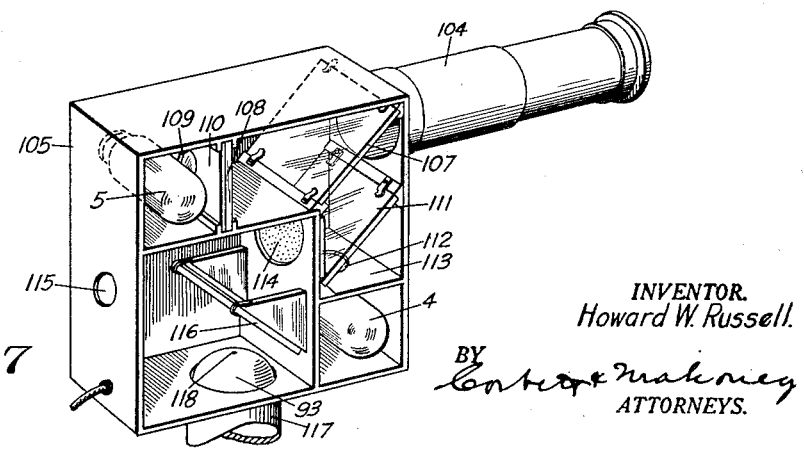
Figure 7 is a perspective view of the structure illustrated in Figure 6 showing one side of the housing removed.

In Figures 5, 6 and 7, I have illustrated a different form of my device. In these figures I have shown an instrument which indicates the temperature of the radiant body but does not record it. This instrument may be made relatively small and may be easily handled.

As before, red and green filters 2 and 3, respectively, are provided. The light passing through filters 2 and 3 activates photoelectric cells 4 and 5, respectively. In the circuit of the photoelectric cell 4 is a fixed resistance 6 while in the circuit of the photoelectric cell 5 is a fixed resistance 7 and a variable resistance 75. A battery 8 supplies the potential on the photoelectric cells 4 and 5. These resistances 6, 7 and 75 are wire-wound high resistances. A vacuum tube 76 is provided in the circuit for amplifying the effects produced by the currents in the photoelectric tubes 4 and 5. This vacuum tube is of the same type as that disclosed in Figure 1 and embodies a cathode 11, a heater 12, a grid 13, a suppressor 14, a screen grid 15 and a plate 16.

A line 77 connects the grid 13 of tube 76 to the movable arm of a double throw single pole switch 78. Line 82 connects one side of switch 78 to the cathode of the photoelectric tube 4 and resistance 6. Line 79 connects the other side of switch 78 to line 80 which is connected to the cathode of photoelectric tube 5. Line 79 has a wire-wound resistance 81 interposed therein which has a resistance equal to the sum of resistances 6, 7 and 75. The line 79 is also connected to the slider of a potentiometer 83. The positive terminal of this potentiometer 83 is connected by line 84 to the cathode 11 and the suppressor 14 of the vacuum tube 76 and to the negative terminal of the battery made up of sections 88, 101, 91 and 102. A line 85 connects the potentiometer 83 to the negative terminal of battery 86. This potentiometer serves to vary the grid bias potential supplied by battery 86 to the grid 13 of tube 76. This battery may be a 7.5 volt battery.

The screen grid 15 of the vacuum tube 76 is connected by a line 87 to the positive terminal of battery 88 which may be a 90 volt battery. The plate 16 of the tube 76 is connected by means of a line 89 and a line 90 to a battery 91 which may be a 60 volt battery. A high resistance 92 is interposed in the line 90.

A cathode ray tube 93 is also connected in the circuit as indicated. This cathode ray tube embodies a cathode 94, a heater 95, a grid 96 and a plate 97. The target 98 of the tube is connected by a line 99 to a line 100 which is connected to the plate 97. A battery 101 which may be a 30 volt battery supplies voltage to the cathode 94 of the tube 93. It will be noted that the grid 96 of the tube 93 is connected to the line 89. A battery 102 which may be a 200 volt battery is connected to the line 100. A high resistance 103 is connected in series with the plate 97 of the tube 93.

If desired, the various batteries may be replaced by a rectified voltage supply.

In Figures 6 and 7 I illustrate the optical system of my instrument which is to be used in connection with the circuit illustrated in Figure 5. A tube 104 extends from the forward side of a housing 105. The tube 104 is provided with a lens system 106 at its forward end. Directly behind the open rear end of the tube 106 and supported within the housing 105 is a filter 107 which is exactly the same as the filter 64 of Figure 2. The green light which passes through the filter 107 passes through a vertically disposed green filter 108 in housing 105 through an aperture 109 in a partition 110 and strikes the photoelectric cell 5. The red light reflected from the filter 107 will pass downwardly through a red filter 111 disposed parallel to the filter 107. This light will pass through an aperture 112 in a partition 113 and will strike the photoelectric tube 4.

Part of the light that strikes the filter 111 will be reflected onto a ground glass screen 114 which is vertically disposed directly behind the filter 111. A peephole 115 is provided in the rear wall of the housing 105 and the screen 114 can be observed through this peephole. Also, through this peephole a mirror 116 can be observed. This mirror is supported at an angle of approximately 45 degrees directly below the screen 114. The cathode ray tube 93 is disposed in the handle 117 secured to the housing 105 and its upper end extends slightly into the housing. This cathode ray tube 93 is directly below the mirror 116. The shadow produced on the fluorescent screen 116 at the top of the tube will be reflected on the mirror 116 and this shadow can be seen by the observer through the peephole 115.

The power supply, variable resistance control, and the vacuum tube may be placed in a box which may be carried by the operator of the instrument. Suitable cables will lead from the unit illustrated in Figure 6 to the other units in my device.

In using my device, it is focused on the radiant body whose temperature is to be measured by looking through the peephole 115 and moving the unit until the image from the body can be seen on the screen 114. The grid bias or potentiometer 83 is adjusted previously to focusing on the body until the angle of the shadow of the cathode ray tube reflected on the mirror 116 is about 45 degrees when no light is falling on the photoelectric cells 4 and 5. The light from the body will be separated into the red and green rays and will produce currents of different intensities in the circuits of the photoelectric cells 4 and 5, respectively. These currents flowing in the grid resistors 6 and 7 cause a change in potential between the grid 13 of the tube 76 and the potentiometer lead 79 from the negative of the grid battery. The variable resistance 75 is then adjusted until there is no change in angle of the shadow produced by the cathode ray tube 93 as compared to the shadow originally produced by such tube before the instrument was focused on the radiant body. In other words, the instrument will be adjusted until the shadow produced on the mirror 116 will be at the same angle, viz., 45 degrees, that it had when no light passed through the filters. It will be apparent that the switch 78 will be closed to line 79 at the time the instrument is initially adjusted so that the angle of the shadow produced by the cathode ray tube 93 will be about 45 degrees for no light falling on the photoelectric cells. Then the switch 78 should be closed to line 82 during the time the instrument is focused on the body and while adjustment of the variable resistance 75 is being made. If the angle of the shadow of the photoelectric tube changes, the variable resistance 75 is adjusted again until the angle of the shadow is the same as it was when no light from the body was entering the instrument.

By adjusting the variable resistance 75 until there is no change in angle of the shadow of the cathode ray tube 93 when the switch 78 is changed from one side to the other, that is, line 79 or 82, the true temperature of the radiant body will be indicated. The ratio of the sum of resistances 75 and 7 to the resistance 6, at this time, will be the same as the ratio of the intensities of the lights falling on cells 4 and 5, respectively. Thus, as in the previously described recording pyrometer, this ratio is a measure of the actual temperature of the emitter. As the resistance 6 is fixed, the variable resistance 75 may be calibrated so that the actual temperature can be read therefrom.

It will be apparent from the above description that I have provided an optical pyrometer having many advantages. The pyrometer is based on the principle of measuring simultaneously the intensities of two radiations of different wavelengths and indicating their ratio. This ratio is a true indication of the temperature of the radiant body. Although I have merely mentioned red and green rays as those which actuate my instrument, it is to be understood that other monochromatic rays may be used. It is only necessary that the rays be of different wavelengths. Also, it is preferred that although they are of different wavelengths that they closely approach each other in wavelength in order to make the instrument more sensitive and accurate. Furthermore, it is to be understood that I am not necessarily limited to the use of monochromatic radiations for actuating my instrument. A group of light rays of one range of wavelengths may be used for actuating one of the photoelectric cells and a group of light rays of a different range of wavelengths may be used for actuating the other photoelectric cell. The intensities of the currents produced by these different groups of wavelengths may be simultaneously compared and recorded or indicated.

My apparatus is of such a nature that the true temperature of the radiant body will be indicated. It is of such a nature that the temperature measurements will be relatively free from errors due to emissivity and absorption due to smoke. It will indicate the true temperature of the radiant body regardless of changes in intensity of the radiations being given off by the body.

Various other advantages will be apparent from the preceding description, the drawings and the following claims.

Having thus described my invention, what I claim is:

1. A pyrometer for determining the temperatures of radiant bodies comprising, in combination, means for separating the radiation given off by a radiant body into rays of different wave lengths, two light-sensitive devices so positioned in the pyrometer as to be acted upon by two of said rays of different wave lengths, the said rays acting upon the said devices being different in wave lengths and being adapted to produce, by acting on each device, a flow of electric current of an intensity proportional to the rays acting thereon, an electrical circuit including both of said light-sensitive devices and impedances to the flow of electric current produced by each of said devices, each of said light-sensitive devices and its respective impedance being in a separate portion of the circuit, a current-responsive electrical device being connected in the circuit so as to indicate when the respective portions are balanced, and means for varying at least one of said impedances to bring these portions into balance, the ratio of the amounts of the respective impedances when the two portions are balanced being a direct measure of the ratio of the intensities of the currents produced by the said light-sensitive devices whereby the temperature of the said body at the instant of balance of the said portions is directly indicated.

2. The pyrometer of claim 1 wherein means are provided for amplifying the electric currents produced by said light-sensitive devices.

HOWARD W. RUSSELL.